US006603283B2

(12) United States Patent
Yuasa et al.

(10) Patent No.: US 6,603,283 B2
(45) **Date of Patent: *Aug. 5, 2003**

(54) VEHICLE HAVING AN ELECTRICAL CONNECTION BOX AND ELECTRICAL CONNECTION BOX FOR USE IN THE VEHICLE

(75) Inventors: Eriko Yuasa, Yokkaichi (JP); Shinshu Kato, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 77 days.

This patent is subject to a terminal disclaimer.

(21) Appl. No.: 09/897,903

(22) Filed: Jul. 5, 2001

(65) Prior Publication Data

US 2002/0002961 A1 Jan. 10, 2002

(30) Foreign Application Priority Data

Jul. 4, 2000 (JP) ...................................... 2000-202321

(51) Int. Cl.[7] ................................................ H02J 7/00

(52) U.S. Cl. ..................................................... 320/104

(58) Field of Search ................................ 320/104, 107; 439/76.2, 949, 45, 732; 174/149 B, 68.2, 70 B, 71 B, 72 B, 88 B, 99 B; 361/823, 641; 318/139

(56) References Cited

U.S. PATENT DOCUMENTS 4,781,600 A 11/1988 Sugiyama et al. ............ 439/45
4,959,018 A 9/1990 Yamamoto et al. ........ 439/76.1
5,430,619 A * 7/1995 Lindenbaum ............... 361/823
5,434,749 A 7/1995 Nakayama .................. 361/775
6,008,982 A 12/1999 Smith ......................... 361/624
6,428,331 B1 * 8/2002 Yamakawa et al. ........ 439/76.2
6,443,748 B1 * 9/2002 Yuasa ......................... 439/205
6,472,606 B2 * 10/2002 Yamakawa et al. ........ 439/76.2
6,476,571 B1 * 11/2002 Sasaki ........................ 318/139
6,478,585 B2 * 11/2002 Yuasa et al. .............. 439/76.2

FOREIGN PATENT DOCUMENTS

JP U 63-160020 10/1988
JP 2000115956 * 4/2000

OTHER PUBLICATIONS

Pitcher, G.: "Stepping Up The Voltage," New Electronics, International Thomson Publishing, London, GB, vol. 32, No. 1, Dec. 14, 1999, pp. 61–62, XP000945954.

* cited by examiner

*Primary Examiner*—Edward H. Tso
*Assistant Examiner*—Pia Tibbits
(74) *Attorney, Agent, or Firm*—Oliff & Berridge, PLC

(57) ABSTRACT

An electrical connection box is provided for a vehicle which has a low-voltage battery of maximum output voltage selected from a range of from about 14V to about 28V, and a high-voltage battery of output voltage higher than that of the first battery structure. The electrical connection box has an insulation material of plate-like shape and, embedded in the insulation material, first bus bars connected in use to the first battery and second bus bars connected in use to the second battery so that the first and second bus bars are at different potentials. Connection tabs of the bus bars project out of the insulation material. Risk of leakage currents between the bus bars is thus minimized.

12 Claims, 6 Drawing Sheets

VEHICLE HAVING AN ELECTRICAL CONNECTION BOX AND ELECTRICAL CONNECTION BOX FOR USE IN THE VEHICLE

BACKGROUND OF THE INVENTION

1. Field of the Invention

The present invention relates to a vehicle, such as an automobile, having an internal combustion engine, one or more batteries powering electrical devices on the vehicle, and an electrical connection box which is mounted on the vehicle, and also to an electrical connection box for use in such a vehicle.

2. Description of the Related Art

Normally one secondary battery, e.g., rechargeable battery, having a rated voltage of 12V and a maximum nominal voltage of 14V is mounted on an internal combustion engine type automobile. A voltage up to the maximum voltage of 14V is applied from the battery to an internal circuit composed of bus bars and the like accommodated in an electrical connection box. The power supply is distributed by the internal circuit of the electrical connection box. The operation of electric/electronic component parts mounted on the vehicle is controlled through electric wires connected with the internal circuit.

On a goods vehicle, such as a lorry or truck, a rated voltage of 24V and a maximum voltage of 28V are applied to a circuit, by a battery structure.

In recent years, electric/electronic component parts have been mounted, in increasing numbers, on a vehicle, and there is an increase in the electric current which is applied to each electric/electronic component part. For example, the electric power required to drive a fan is conventionally 130 watts, but has become 260 watts in recent years. At the rated voltage of 12V of the battery, it has become impossible to operate suction and exhaust devices of an engine, an electromotive power steering, and the like devices, requiring a high voltage such as 36V. Therefore, they are mechanically operated by the driving force of the engine.

With the increase of the electric current applied to each electric/electronic component part, the diameter of the electric wires used has become larger. Further, with rapid increase of the number of electric/electronic component parts, the number of electric wires has increased recently, which has increased the diameter of a wire harness including a bundle of electric wires. Consequently, the weight of the electric wires to be wired on a vehicle body has increased.

As described above, if the power supply from the battery is incapable of operating the suction and exhaust devices of the engine, they are mechanically operated. In this case, it is impossible to accomplish fine control of the operation of the suction and exhaust devices. Further, much fuel is consumed, which pollutes the environment. Accordingly, it is preferable to operate the suction and exhaust devices of the engine and the like not mechanically but electrically by the power supply from the battery.

In the case where the circuit is so constructed that a voltage higher than 14V can be applied to the circuit of the electrical connection box composed of bus bars and the like, it is possible to reduce the required electric current and thus the diameter of the electric wires and the size of a bundle of a plurality of electric wires (e.g., wire harness). Therefore, it is possible to reduce the weight of the electric wires.

Further, with the application of a high voltage to the circuit composed of bus bars and the like, it is possible to control the operation of the suction and exhaust devices, the power steering motor, and the like not mechanically or hydraulically but electrically. In this case, it is possible to accomplish fine control of the operation of suction and exhaust devices and the like. Further, fuel consumption can be reduced, which reduces pollution.

It is preferable to apply a high voltage of about 42V to the electromotive power steering motor, the suction and exhaust devices of the engine, the fan, and/or other devices requiring a high voltage. On the other hand, in an automobile, it is preferable to apply the rated voltage of 12V (maximum voltage: 14V) to signal-generating devices of the electric/electrical components parts and coils of relays.

However, if the electrical connection box for distributing the power supply is provided with a circuit to which a low voltage up to the maximum voltage of 14V (28V in a truck) is applied and with a circuit to which a high voltage of about 42V is applied, a leak current is liable to be generated between the two circuits, owing to the potential difference. Such a leak current may particularly occur if water or dirt enters the electrical connection box. The leak current is also liable to be generated in the circuit to which the high voltage of about 42V is applied.

SUMMARY OF THE INVENTION

It is an object of the present invention to prevent or reduce generation of leak currents in an electrical connection box, thereby permitting a circuit to which electric current having a low voltage is applied and a circuit to which electric current having a high voltage is applied.

According to the present invention, there is provided a vehicle having an internal combustion engine providing motive drive of the vehicle, a first, low-voltage battery structure including at least one secondary battery (rechargeable battery), and having a nominal maximum output voltage selected from a range of form about 14V and to about 28V, a second, high-voltage battery structure including at least one secondary battery (e.g., rechargeable battery), and having a nominal maximum output voltage higher than that of the first battery structure and not more than 200V, a plurality of electrical devices powered by the first and second battery structures, and an electrical connection box containing an electrical circuit therein which effects connection between the first and second battery structures and the plurality of electrical devices.

The electrical circuit includes an insulation material in a generally plate-like shape and, embedded in the insulation material, at least one first bus bar connected to the first battery structure and at least one second bus bar connected to the second battery structure, whereby in operation the first and second bus bars are at different potentials, the insulation material electrically insulating the bus bars from each other.

Each of the first and second bus bars has at least one connection tab projecting out of the insulation material.

In a second aspect, the invention provides an electrical connection box for use in the vehicle of the invention described above. The electrical connection box contains an electrical circuit including an insulation material in a generally plate-like shape and, embedded in the insulation material, at least one first bus bar adapted to be connected in use to the first battery structure and at least one second bus bar adapted to be connected in use to the second battery structure, whereby in operation the first and second bus bars are at different potentials. Each of the first and second bus bars has at least one connection tab projecting out of the insulation material.

In conventional vehicle junction boxes, bus bars are fixed to the surface of an insulation plate. But in the present invention, the bus bars are embedded in the insulation material. More specifically, an insulation material, such as synthetic resin, is filled in the space where a leak current is liable to be generated, namely, the space between the low-voltage bus bar and the high-voltage bus bar and the space between the high-voltage bus bars. Thus, it is possible to prevent or minimize generation of leak currents.

Because the bus bars are embedded in the resin, the low-voltage bus bar and the high-voltage bus bar can be disposed at random in the same body of insulation material. Thus, the construction of the circuit is not limited to a specific one but can be designed freely.

Preferably, a lower portion of the tab of each low-voltage bus bar and high-voltage bus bar is embedded in the insulation material except a portion of the tab to be fitted on a terminal.

Because the tabs formed by bending the bus bars are required to be connected to terminals of an external circuit, the tabs project from the surface of the insulation material. As described above, the tabs are preferably embedded in the material except portions of the tabs to be fitted on terminals. Therefore, it is possible to prevent generation of a leak current although the tabs are adjacent to each other.

Preferably a projection such as a spigot or a rib projects from an insulation board or plate, which is a part of the insulation material. The projection is inserted into a hole formed on each low-voltage bus bar and high-voltage bus bar and is deformed to fix the bus bars to the board. The low-voltage bus bar and the high-voltage bus bar are covered by a surface body of resin, e.g. in a die or mold, to cover the bus bars with the resin after the fixing of the bus bars to the board. In this manner, it is easy to manufacture the circuit.

It is preferable that the high voltage to be applied to the high-voltage bus bar is about 42V. In this case, the voltage applied to the high-voltage bus bar at 42V may be provided by connecting in series three batteries each having a rated voltage of 12V (nominal maximum voltage: 14V) generally used in automobiles. Needless to say, it is possible to use a single battery having a maximum voltage of 42V. The reason why the high voltage to be applied to the high-voltage bus bar is preferably set to about 42V is partly because using a voltage close to or above 50V for the high-voltage bus bar may be more dangerous. The present inventors have conducted salt water experiments in order to ascertain the degree of risk when applying a voltage of 42V in an electrical junction box suitable for use in an automobile engine compartment, as follows:

1 ml of salt water was injected into each terminal hole of the casing of a junction box which had bus bars disposed inside. Electrical components, such as relay, fuse, connectors etc., were mounted on the casing. A voltage of 42V was applied to bus bars of the junction box for 8 hours and suspended for 16 hours. This was repeated twice. There was initially no change to the bus bars and electrical components. However, after the third repetition, it was found that extra electric current passed between the bus bars generating heat and a portion of bus bars was melted. The heat also melted resin around bus bars such as an insulation plate, casing and resin portion of electrical components adjacent the casing.

Accordingly, it was confirmed that in consideration of normal use condition of an automobile, the application of the electric power at 42V to the electric/electronic component parts should not cause a problem.

BRIEF DESCRIPTION OF THE DRAWINGS

Embodiments of the present invention will be described below by way of non-limitative example, with reference to drawings, in which.

DETAILED DESCRIPTION OF THE PREFERRED EMBODIMENTS

Figure 1:
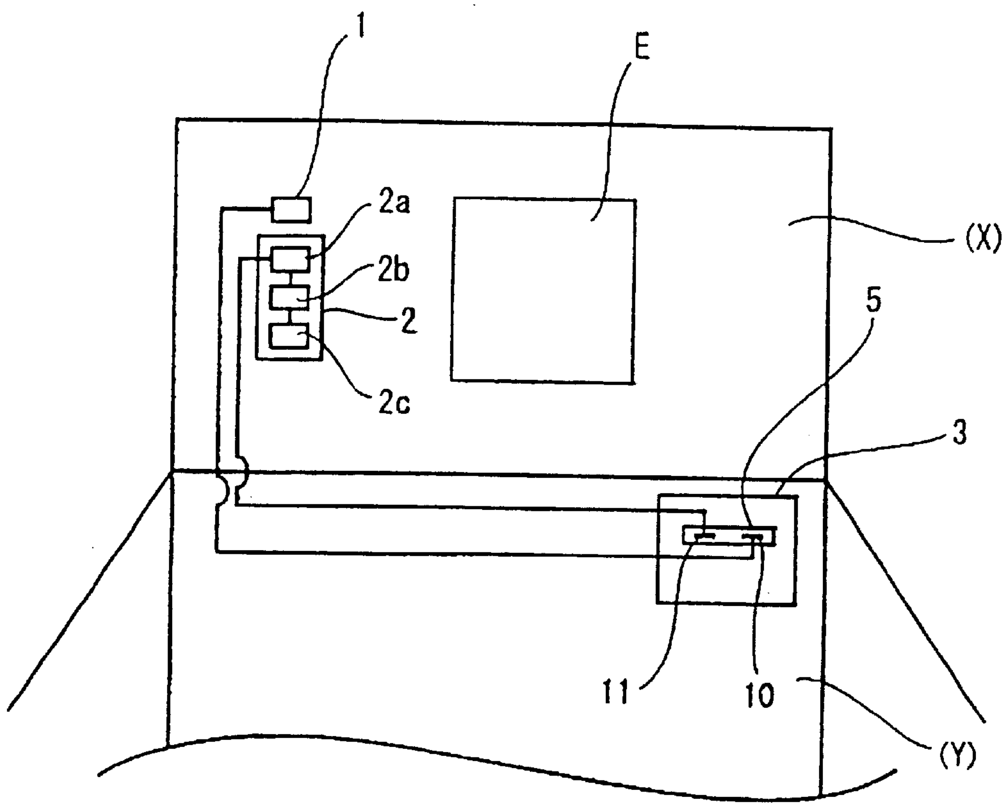
FIG. 1 is a diagram of elements of a vehicle which is an embodiment of the present invention.

As schematically shown in FIG. 1, in an automobile to which the present invention is applied, an engine E mounted in an engine room (X) provides drive of the vehicle and generates electrical power, e.g. through an alternator (not shown). A low-voltage battery structure 1 and a high-voltage battery structure 2 are mounted in the engine room (X), and are charged by the alternator. The low-voltage battery structure 1 may be or include a general-purpose battery having a rated voltage 12V and a nominal maximum voltage of 14V. The high-voltage battery 2 includes three battery units 2*a*, 2*b* and 2*c* connected in series to generate a nominal maximum voltage of 42V. Each of the three battery units, 2*a*, 2*b* and 2*c* has a rated voltage of 12V (nominal maximum 14V). Such 12V rechargeable (secondary) battery units are conventional. Needless to say, it is possible to use a single battery having a maximum voltage of 42V. The batteries 1 and 2 and their connections to the alternator are conventional and need not be described in detail here.

The low-voltage battery structure 1 is connected to low-voltage bus bars 10 accommodated in an electrical connection box 3 composed of a junction box mounted in a vehicle interior (Y) (or, depending on the vehicle, in the engine room) to apply a low voltage (maximum voltage: 14V) to the low-voltage bus bars 10.

The high-voltage battery structure 2 is connected to high-voltage bus bars 11 accommodated in the same electrical connection box 3 to apply a high voltage (maximum voltage: 42V) to the high-voltage bus bars 11.

The load side of the high-voltage bus bars 11 is connected to electrical devices or actuators to operate them electromotively. The actuators (not shown) may include a power steering motor, suction and exhaust devices of the engine, and like devices consuming high power. The load side of the low-voltage bus bars 10 is connected to appliances (not shown), such as sensors, lamps, and other devices consuming relatively low power, which are typically provided in an automobile.

Figure 2:
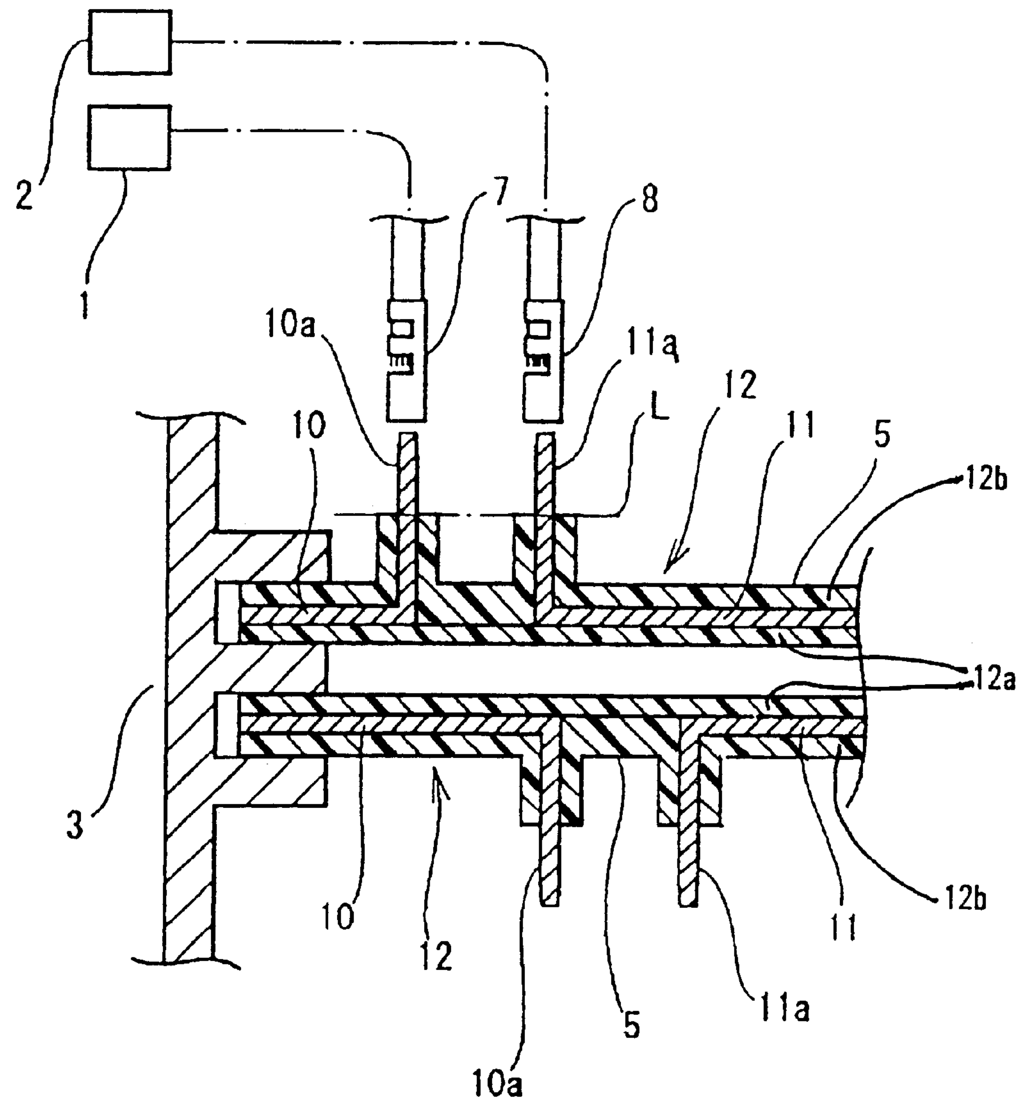
FIG. 2 is a partial cross sectional view of an electrical connection box embodying the invention, accommodating a circuit, applicable in the vehicle of FIG. 1.

As shown in FIG. 2, the electrical connection box has a casing 3 (partially shown) of rigid molded synthetic resin in which are mounted a plurality of circuit boards hereinbelow called circuits 5 (also partially shown). Each circuit 5 comprises a generally flat plate-like insulation body 12 comprising a planar insulation board 12*a* made of synthetic resin and a molded covering layer 12*b* made of synthetic resin. Fixed on the board 12*a* and embedded in the resin 12*b* are the low-voltage bus bars 10 and the high-voltage bus bars 11, which mainly lie parallel to the plane of the body 12 and have connection tabs 10*a*, and 11*a*, respectively, bent to stand up perpendicularly to this plane and partially projecting from the resin 12*b*. The bus bars 10 and 11 are made of metal strips and the tabs 10*a* and 11*a* may each be one-piece with the respective bus bars. The projecting portions of the tabs 10*a* and 11*a* are indicated in FIG. 2 as arranged to be joined to terminals 7 and 8 on wires connected to the respective battery structures 1 and 2.

Portions of the resin of the body 12 are shown in FIG. 2 extending up the sides of the vertical tabs 10*a* and 11*a* to increase the insulation effect.

Figure 3:
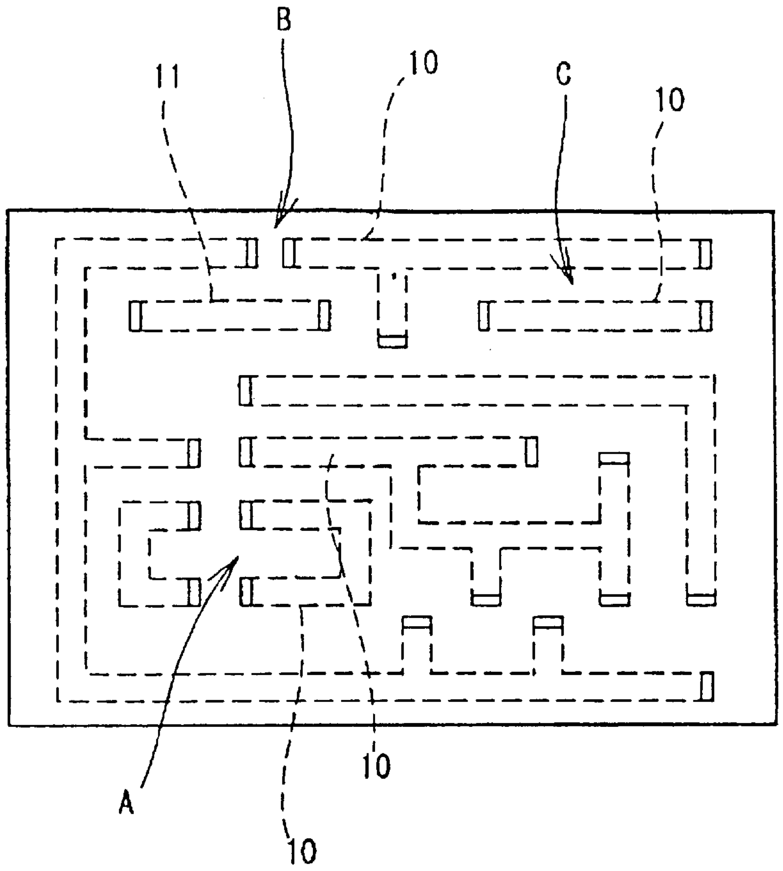
FIG. 3 is a plan view of a circuit of FIG. 2.

FIG. 3 shows a typical example of the arrangement of the bus bars 10 and 11 in the plate-like insulating body 12.

The low-voltage bus bars 10 and the high-voltage bus bars 11 are disposed at random or freely in consideration of efficiency in designing the circuit. In other words, the low-voltage bus bars 10 are not necessarily disposed at one side of the circuit 5 only with the high-voltage bus bars disposed only at the other side thereof.

Therefore, the circuit 5 may include a region A in which the low-voltage bus bars 10 are adjacent to each other, a region B in which the low-voltage bus bar 10 and the high-voltage bus bar 11 are adjacent to each other, and/or a region C in which the high-voltage bus bars 11 are adjacent to each other. In each of the regions A, B and C, the space between the adjacent bus bars are filled with the insulating resin.

As in the case of bus bars in conventional junction boxes, the low-voltage bus bar 10 and high-voltage bus bar 11 may be bent to form the tabs 10*a* and 11*a* thereon, respectively. Directly or through relaying or transfer terminals, the tabs 10*a* and 11*a* are connected to terminals of external circuits through connector sockets provided on the outer surface of the electrical connection box 3, by fitting the terminals on the tabs 10*a* and 11*a*. By external connection, there may also be electrical connection between the bus bars. For example, as shown in FIG. 2, a terminal 7 mounted at an end of an electric wire connected to the low-voltage battery structure 1 is connected to the power supply side of the low-voltage bus bar 10, and a terminal 8 mounted at an end of another electric wire connected to the high-voltage battery structure 2 is connected to the power supply side of the high-voltage bus bar 11.

Figure 4:
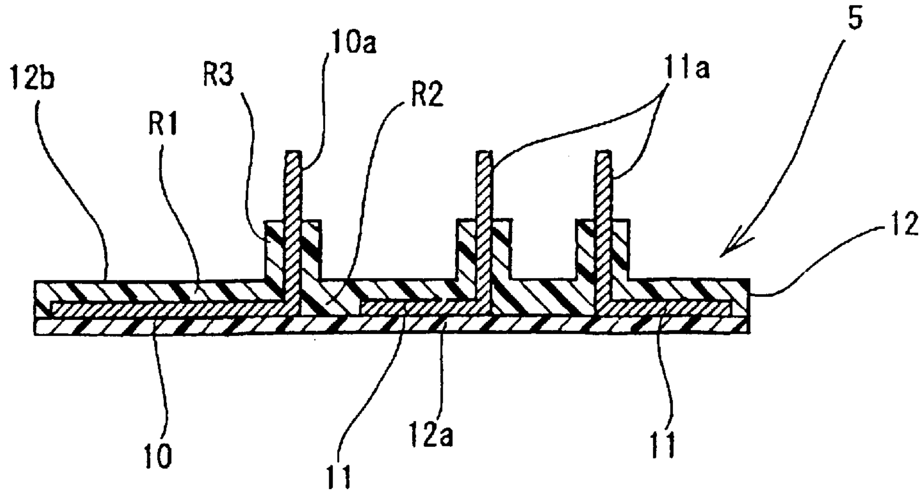
FIG. 4 is a sectional view of the circuit used in the box of FIG. 2.

As shown in FIG. 4, the tabs 10*a* and 11*a* project from upstanding portions R3 of the resin 12*b*. Portions R1 of the resin 12*b* overlie the flat portions of the bus bars 10 and 11, and portions R2 of the resin 12*b* lie between the bus bars and provide insulation to prevent leak currents. The insulating body 12 composed of the board 12*a* and resin 12*b* thus embeds the bus bars 10 and 11.

The tabs 10*a* and 11*a* are embedded in the resin portions R3 from their lower ends to a position corresponding to a terminal fit-on line L up to which the terminals 7 and 8 are fitted on the tabs 10*a* and 11*a*, respectively.

Although the low-voltage bus bars 10 and the high-voltage bus bars 11, to which different voltages are applied, are disposed in the circuit 5, the low-voltage bus bars 10 and the high-voltage bus bars 11 are completely embedded in the resin. Thus, even though a low-voltage bus bar 10 and a high-voltage bus bar 11 are adjacent to each other, it is possible to prevent leak currents from being generated. Further, it is possible to prevent leak current from being generated between the high-voltage bus bars 11 adjacent to each other. Because the tabs 10*a* and 11*a* standing up perpendicularly from the insulation board 12*a* are embedded in the resin portions R3 from their lower ends to the position corresponding to a terminal fit-on line L (see FIG. 2), it is possible to prevent leak current from being generated between the tabs 10*a* and 11*a*.

Figure 5A:
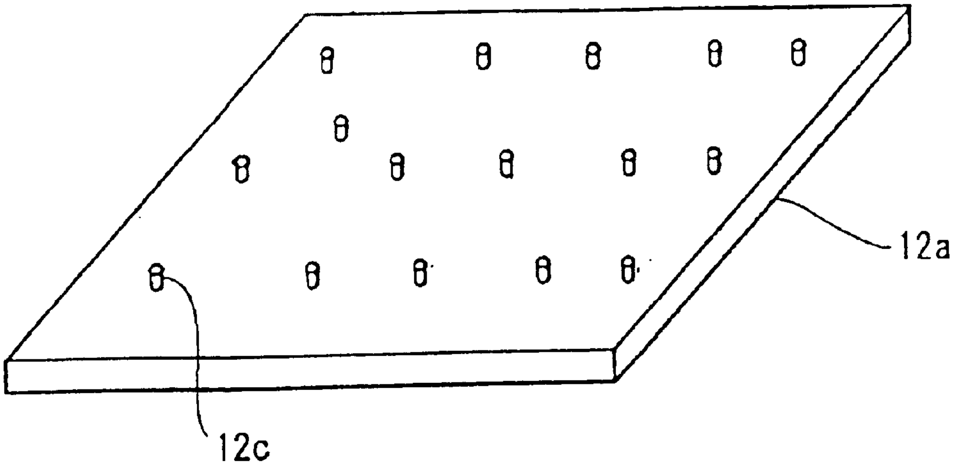
FIGS. 5A to 5D show stages in a process of manufacture of the circuit of FIG. 4.

As shown in FIGS. 5A–5D, the circuit 5 may be formed by, for example, the following procedure:

As shown in FIG. 5A, initially, the substrate or board portion 12*a* of the flat insulation body 12, with spigots 12*c*, is formed by molding resin.

Figure 5B:
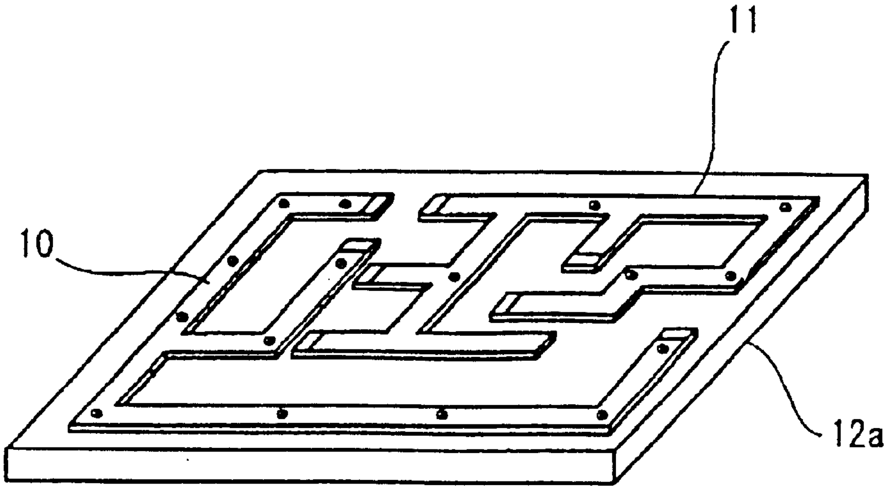
Figure 5C:
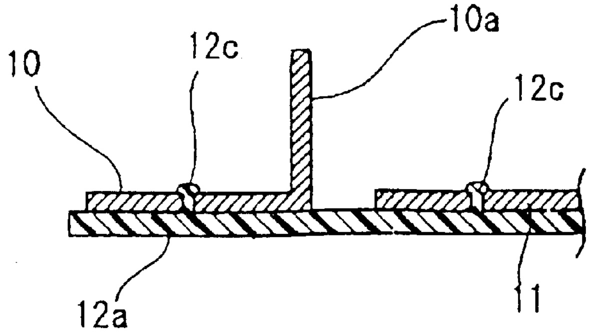

Then, as shown in FIGS. 5B and 5C, the low-voltage bus bars 10 and the high-voltage bus bars 11 are located on the surface of the board 12*a*, by the spigots 12*c*.

The spigots 12*c* projecting from the board 12*a* are inserted into holes formed in each of the bus bars 10 and 11 and deformed to fix the bus bars to the board 12*a*. The board 12*a* is made of suitable resin for this purpose. Where a gap is required in the circuit of the low-voltage bus bars 10 and the high-voltage bus bars 11, they may be cut.

Figure 5D:
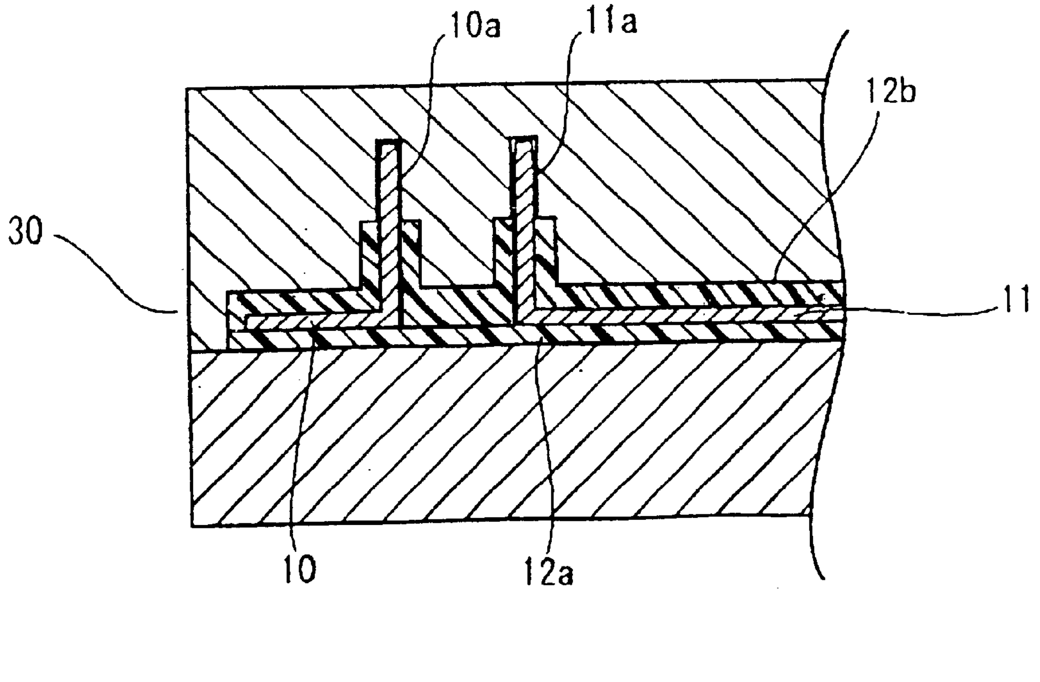

Then, as shown in FIG. 5D, the semi-finished product of the circuit 5 is put in a molding die. Molding resin material for the surface resin 12*b* is injected into the die 30 to form the resin 12*b* covering the surface of the bus bars 10 and 11, the spaces between the bus bars 10 and 11, and the lower portions of the tabs 10*a* and 11*a*. Thereby, except at the portions of the tabs 10*a* and 11*a* to be fitted on terminals, the bus bars 10 and 11 are covered with the molding resin.

Figure 6:
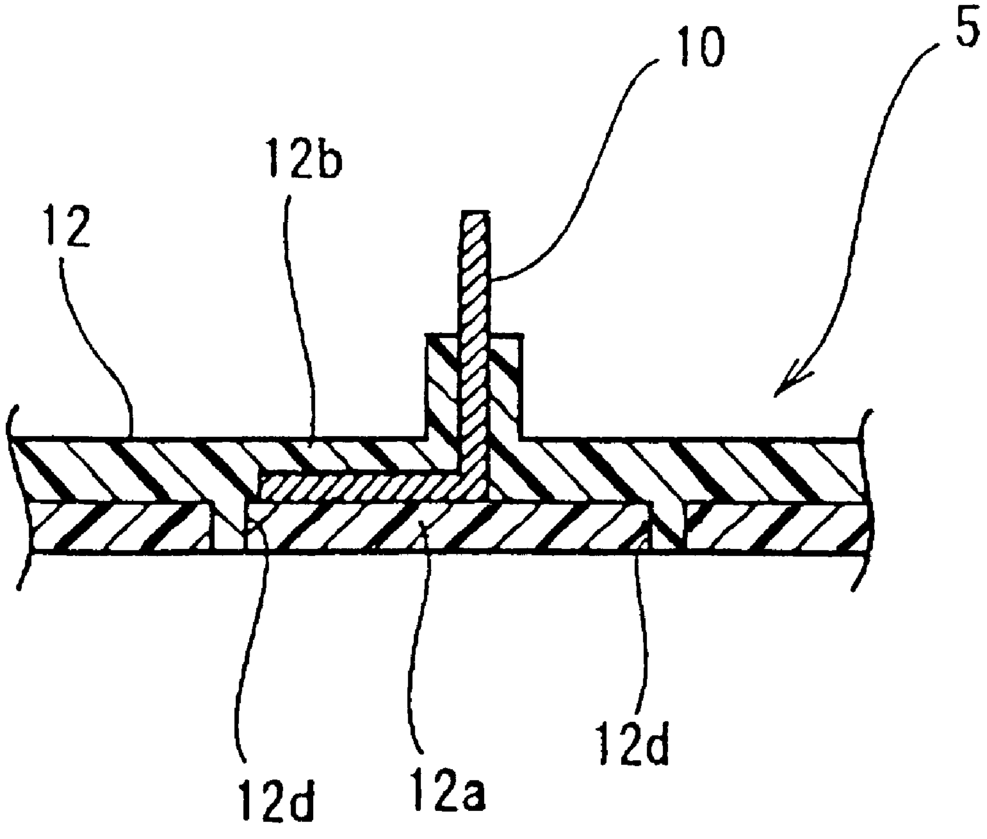
FIG. 6 is a sectional view showing a modified form of the circuit to be used in the box of FIG. 2.

The molding resin forming the surface resin 12*b* has a melting temperature or a thermal deformation temperature lower than that of the board 12*a*. The molding resin has a thermal coefficient of shrinkage and a thermal coefficient of expansion similar to those of the board 12*a*. As shown in FIG. 6, a hole or holes 12*d* may be formed in the board 12*a* to be filled by the resin 12*b*, to fix the resin 12*b* and the board 12*a* to each other with high strength.

The circuit 5 of these embodiments is thus applied to an automobile on which the battery of the rated voltage of 12V is mounted. However, in the case where a maximum voltage of 28V is applied to a bus bar in the automobile or a larger vehicle such as a truck, the bus bar to which the voltage of 28V is applied is the low-voltage bus bar and the bus bar to which the voltage of 42V is applied is the high-voltage bus bar. The construction of the circuit 5 and connection box in this case is the same as that of the embodiment.

In the embodiment, the maximum voltage of 42V is applied to the high-voltage bus bar 11. But needless to say, a high voltage of 42V-200V can be applied to the high-voltage bus bars 11, provided that safety is ensured.

The present invention therefore makes it possible to reduce the diameter of electric wires and the size of the wire harnesses in a vehicle by reducing the amount of electric current, by applying a high voltage to some circuit portions of the electrical connection box. To this end, the circuit of the electrical connection box accommodating the low-voltage bus bars and the high-voltage bus bars to which different voltages are applied is so constructed that the bus bars are completely embedded in the resin. Thus, it is possible to prevent leak currents from being generated between the low-voltage bus bar and the high-voltage bus bar.

While the invention has been illustrated by the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

What is claimed is:

1. A vehicle comprising:

an internal combustion engine providing motive drive of the vehicle;

a first, low-voltage battery structure comprising at least one secondary battery, and having a nominal maximum output voltage of from about 14V to about 28V;

a second, high-voltage battery structure comprising at least one secondary battery, and having a nominal maximum output voltage higher than that of said first battery structure and not more than about 200V;

a plurality of electrical devices powered by said first and second battery structures; and an electrical connection box containing an electrical circuit therein which effects connection between said first and second battery structures and said plurality of electrical devices, said electrical circuit comprising an insulation material in a generally planar shape and, embedded in said insulation material, at least one first bus bar connected to said first battery structure and at least one second bus bar connected to said second battery structure, said first and second bus bars being at different potentials in operation, said insulation material electrically insulating said first and second bus bars from each other, and wherein each of said first and second bus bars has at least one connection tab projecting through said insulation material.

2. A vehicle according to claim 1, wherein a plurality of said low-voltage bus bars and a plurality of said high-voltage bus bars are freely arranged among one another in said insulation material without contacting each other.

3. A vehicle according to claim 1, wherein said insulation material embeds a portion of each said connection tab up to a location where said connection tab is attached to a terminal.

4. A vehicle according to claim 1, wherein said bus bars have holes formed therein, and said insulation material comprises a planar board on which said bus bars are fixed by projecting portions of material of said planar board, said projecting portions being inserted into the holes of said bus bars and deformed to fix said bus bars to said board, said insulation material further comprising molded resin material on said board.

5. A vehicle according to claim 1, wherein the nominal maximum output voltage of said second battery structure is about 42V.

6. An electrical connection box adapted for use in a vehicle which includes a first, low-voltage battery structure comprising at least one secondary battery, and having a nominal maximum output voltage of from about 14V to about 28V, and a second, high-voltage battery structure comprising at least one secondary battery, and having a nominal maximum output voltage higher than that of said first battery structure and not more than about 200V, said electrical connection box containing an electrical circuit comprising an insulation material in a generally planar shape and, embedded in said insulation material, at least one first bus bar connected to said first battery structure and at least one second bus bar connected to said second battery structure, said first and second bus bars being at different potentials in operation, and wherein each of said first and second bus bars has at least one connection tab projecting out of said insulation material.

7. An electrical connection box according to claim 6, wherein said insulation material of said electrical circuit includes a flat plate member having a surface on which said first and second bus bars are mounted and at least one body of molded resin material on said surface of said plate member, and wherein at least part of each of said first and second bus bars are embedded between said surface and said resin material with said tabs thereof projecting out from said resin material away from said surface.

8. An electrical connection box according to claim 6, wherein a plurality of said low-voltage bus bars and a plurality of said high-voltage bus bars are freely arranged among one another in said insulation material without contacting each other.

9. An electrical connection box according to claim 6, wherein said insulation material embeds a portion of each said connection tab up to a location where said connection tab is attached to a terminal.

10. An electrical connection box according to claim 6, wherein said bus bars have holes formed therein, and said insulation material comprises a planar board on which said bus bars are fixed by projecting portions of material of said planar board, said projecting portions being inserted into holes of said bus bars and deformed to fix said bus bars to said board, said insulation material further comprising molded resin material on said board.

11. An electrical connection box according to claim 6, wherein the voltage applied to said high-voltage bus bars in use is a nominal maximum voltage of about 42V.

12. A vehicle comprising:

an internal combustion engine providing motive drive of the vehicle;

a first, low-voltage battery structure comprising at least one secondary battery, and having a nominal maximum output voltage of from about 14V to about 28V;

a second, high-voltage battery structure comprising at least one secondary battery, and having a nominal maximum output voltage higher than that of said first battery structure and not more than about 200V;

a plurality of electrical devices powered by said first and second battery structures; and an electrical connection box containing an electrical circuit therein which effects connection between said first and second battery structures and said plurality of electrical devices, said electrical circuit comprising an insulation material in a generally planar shape and, embedded in said insulation material, at least one first bus bar connected to said first battery structure and at least one second bus bar connected to said second battery structure, said first and second bus bars being at different potentials in operation, said insulation material electrically insulating said first and second bus bars from each other, and wherein each of said first and second bus bars has at least one connection tab projecting out of said insulation material, wherein said insulation material of said electrical circuit includes a flat plate member having a surface on which said first and second bus bars are mounted and at least one body of molded resin material on said surface of said plate member, and wherein the at least part of each of said first and second bus bars are embedded between said surface and said resin material with said tabs thereof projecting out from said resin material away from said surface.

* * * * *